United States Patent Office 2,972,638
Patented Feb. 21, 1961

2,972,638
PROCESS FOR MAKING FLUORINATED COMPOUNDS

George Van Dyke Tiers, St. Paul, Minn., assignor to Minnesota Mining and Manufacturing Company, St. Paul, Minn., a corporation of Delaware No Drawing. Filed Sept. 2, 1958, Ser. No. 758,596

10 Claims. (Cl. 260—653.1)

This invention relates to a novel process for making stable, saturated, polyfluoro-iodo compounds and to certain of the compounds so produced. This application is a continuation-in-part of my copending application Serial No. 579,114, filed April 18, 1956, now abandoned.

Previous methods of making saturated polyfluoro-iodo compounds have centered about the attachment of perfluoroalkyl groups to olefinic organic structures by way of addition reactions of perfluoro iodides with such olefinic structures. Examples of these methods are illustrated in the articles by Henne et al., J. Am. Chem. Soc. 73, 1791 (1951); by Haszeldine et al., Chem. and Ind., 1951, 684; and by Haszeldine, J. Chem. Soc., London, 1953, 1199; all of which articles disclose such addition reactions with $CF_3I$ to give products, e.g., $$CF_3CHRCHICH_3$$

wherein the iodide is on a carbon atom separated from the $CF_3$ group by only one intervening carbon atom. These compounds are thus activated for dehydrohalogenation under the action of even mild bases, HI splitting out under the action of such bases. Because of this, it is not feasible to react such compounds with tertiary amines in the production of quaternary ammonium iodides and other salts which are useful surface active agents in organic media as well as emulsion polymerization agents for fluorinated monomers.

This invention provides a new and useful process for the production of stable, polyfluoro-iodo compounds as addition products of the reaction of a polyfluoroalkyl methyl iodide and an ethylenically unsaturated aliphatic compound which comprises reacting a polyfluoroalkyl methyl iodide represented by the formula $Y(CF_2)_mCH_2I$, wherein Y is hydrogen or fluorine and m is an integer from 1 to about 12, and preferably about 3 to 12, with an ethylenically unsaturated aliphatic compound copolymerizable with other olefinic compounds under free-radical initiation and being represented by the formula

wherein the remaining valences of the ethylenic carbon atoms are satisfied by a combination of monovalent radicals, the algebraic sum of the Hammett sigma (para) parameter values of which is not greater than +0.2.

Following the process of the present invention, highly fluorinated alkyl iodides are provided wherein the iodine-carrying carbon atom is separated from the highly fluorinated portion of the molecule by at least two intervening carbon atoms. The resulting compounds are resistant to the loss of HI under the action of bases and can participate in the wide variety of reactions normally associated with alkyl iodides while preserving the advantages of compounds possessing a highly fluorinated end group, and where the end group is composed of a plurality of fluorinated carbons, an inert oleophobic and hydrophobic fluorocarbon "tail."

The reaction can be expressed generally as follows:

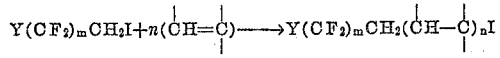

where m and Y are as noted previously, and n is an integer having a value from 1 to about 3 representing the number of moles of the olefinic compound reacted per mole of polyfluoroalkyl methyl iodide. The reaction proceeds by a free-radical mechanism in the presence of a free-radical initiator such as ultraviolet light, benzoyl peroxide, di-tertiary butyl peroxide, alpha, alpha'-azodiisobutyronitrile, and the like.

Olefinic compounds which are not copolymerizable with other olefins under free-radical initiation are those which contain, for example, mercapto or 2,5-dihydroxyphenyl groups, substituents such as bromine or iodine bonded to a carbon atom immediately adjacent one of the ethylenically unsaturated carbon atoms and similar olefinic compounds.

The concept of the Hammett sigma (para) parameter values is fully explained by H. H. Jaffé in Chemical Reviews, volume 53 (1953), beginning at page 191, particularly at pages 219–233, wherein are provided numerical values for a large number of substituent radicals. The article also provides the basis on which such numerical values may be derived. The article, and information contained or referred to therein, is included here by reference.

The subject reaction takes place in competition, in many cases, with the tendency of the unsaturated compound to homopolymerize. This may result in the formation of polymers of many monomer units of the olefin before the molecule reacts with a molecule of the fluorinated iodide (i.e., the ratio of fluorinated iodide units to olefin monomer units may be 1:10, 1:20 or even higher in a given molecule). The addition of the olefinic reactant at a rate about equal to its rate of consumption provides for low concentration of the reacting monomer and favors the production of the more desirable lower adducts, i.e., those in which n=1–3, wherein the beneficial effects of a fluorinated group are more pronounced than with higher adducts. These more desirable lower adducts are best obtained using relatively inert olefinic compounds such as octene-1 and undecylenic acid which do not homopolymerize.

The preferred compounds are those wherein the perfluoroalkyl or omega hydro-perfluoroalkyl group is at least three carbons in length since these compounds have stable and inert perfluoroalkyl "tails" which are characteristically oleophobic as well as hydrophobic. While those compounds having the three carbon omega-hydroperfluoroalkyl "tail" are not so stable or inert as the compounds having completely fluorinated "tails," they nevertheless exhibit marked oleophobic and hydrophobic properties. Compounds of this invention with either of these "tails" impart unique surface active and surface treatment properties not possessed by corresponding hydrocarbon compounds, the latter being oleophilic and often highly soluble in oils and hydrocarbons. These compounds may be coated on a substrate so as to form a fluorocarbon type surface which is repellant to both water and oils and greases.

For example, the compound

produced by free-radical initiated addition of the 1,1-omega-trihydroperfluorononyliodide $(CF_2H(CF_2)_7CH_2I$ to 10-hendecenoic acid, exhibits powerful oleophobic properties. A monolayer film of this compound deposited on platinum from hexane solution according to the general procedure of Schulman and Zisman (J. Colloid Sci. 7, 465 (1952)) is repellent to water and to various organic liquids, such as glycerol, octyl alcohol, hexachlorobutadiene, tricresyl phosphate, tetradecane, xylene, and bromonaphthalene, as evidenced by their failure to spread when applied to the surface of such film. This acid, in the form of a water-soluble salt, is also highly effective in lowering the surface tension of water even at extremely low concentrations.

Since the compounds which may be produced by the process herein described may contain a wide variety of other radicals in addition to the fluorocarbon radical, and the chain length of the latter may be widely varied, the compounds are found to be useful in a great number of applications, including surface coatings or treatments, polymers, waxes, hydraulic fluids, solvents, etc.

The following specific examples will serve to further describe the invention; however, it is to be understood the specific examples are illustrative only and the invention is not limited thereto.

Example 1

Fifteen grams of 1,1-dihydroperfluorobutyl iodide ($C_3F_7CH_2I$), 5.4 grams of 1-octene ($CH_2=CHC_6H_{13}$) and 0.8 gram of ditertiary butyl peroxide were sealed in a 30 ml. heavy-walled glass ampoule and the ampoule was heated to 150° C. for 16 hours. Upon distillation of the reaction product there was recovered 2.7 grams of unreacted $C_3F_7CH_2I$ and 11.3 grams of the 1:1 adduct $C_3F_7CH_2CH_2CHIC_6H_{13}$ for a yield of 68% based on the unrecovered iodide. The boiling point of the adduct was found to be 134° C. at a reduced pressure of 20 mm. of mercury and its refractive index, $n_D^{25}$, was 1.4162. Analysis:

|   | Calculated for $C_{12}H_{18}F_7I$ | Found |
| --- | --- | --- |
|   | Percent | Percent |
| C | 34.1 | 34.1 |
| F | 31.5 | 31.2 |
| I | 30.1 | 30.2 |

The —$C_6H_{13}$ alkyl group is closely similar to the —$C_4H_9$ group which has a Hammett sigma (para) parameter value of —0.161.

Example 2

Telomerization of $C_3F_7CH_2I$ with methacrylonitrile:

In a 43 ml. autoclave was placed $C_3F_7CH_2I$ (31.0 g.) redistilled methacrylonitrile (5.0 g.) and di-t-butyl peroxide (0.7 g.). The autoclave was sealed and heated for fifteen hours at 117° C. (inside temperature). From the autoclave there was recovered 4.7 g. of yellow solid in addition to unreacted $C_3F_7CH_2I$. The yellow solid, dried at 115° C., was shown by analysis to be a telomer of $C_3F_7CH_2I$ and methacrylonitrile. Analysis: Calcd. for

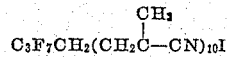

13.6% F, 13.1% I. Found: 13.1% F, 10.0% I.

It is believed that some iodine has been lost through dehydrohalogenation.

Example 3

Telomerization of $C_3F_7CH_2I$ with acrylic acid:

In a 180 ml. autoclave was placed $C_3F_7CH_2I$ (62.0 g.), glacial acrylic acid (7.2 g.) and di-t-butyl peroxide (1.2 g.). After sealing and heating the autoclave for twenty hours at 140° C. (inside temperature), the autoclave was opened and in addition to recovered unreacted $C_3F_7CH_2I$, there was obtained 7.5 g. of white solid telomer. Analysis:

Calcd. for $C_3F_7CH_2(CH_2CHCO_2H)_{60}I$: 2.88% F, 2.74% I. Found: 2.9% F, 2.8% I.

The high value found for "$n$" in this and in the previous example is attributed to the relatively high polymerization activity of these monomers.

Example 4

Addition of $C_3F_7CH_2I$ to undecylenic acid:

In a 43 ml. autoclave was placed $C_3F_7CH_2I$ (31.0 g.), undecylenic acid (18.4 g.) and di-t-butyl peroxide (1.0 g.). The autoclave was sealed and heated for sixteen hours at 145° C. (inside temperature). The autoclave was opened and the product was transferred to a high vacuum short path still. 20.5 g. of unreacted $C_3F_7CH_2I$ was recovered as was 13.4 g. of undecylenic acid. The desired 1:1 adduct, $C_3F_7CH_2CH_2CHI(CH_2)_8CO_2H$ had $n_D^{25}$ 1.4396 and boiled at 136° C. at 0.010 mm.; 11.4 g. of this material was obtained, the yield being 68% of theoretical after correction was made for the unreacted $C_3F_7CH_2I$ recovered. The formula was confirmed by analysis: Calcd. for $C_{15}H_{22}F_7IO_2$: 36.5% C, 26.9% F, 25.7% I. Found: 37.0% C, 26.8% F, 24.7% I; and the infrared spectrum was consistent with the postulated structure.

Example 5

Telomerization of $C_3F_7CH_2I$ to n-allyl acetamide:

In a 43 ml. autoclave was placed $C_3F_7CH_2I$ (31.0 g.), n-allyl acetamide (9.9 g.) and di-t-butyl peroxide (0.7 g.). The autoclave was sealed and heated for twenty hours at 145° C. The viscous brownish-black product was subjected to short path high vacuum distillation. 4.6 g. of brown product, $n_D^{25}$ 1.4610, B.P. 132° at 0.050 mm., was obtained. The infrared spectrum indicated that little, if any, n-allyl acetamide was present in this fraction. Its formula was established by analysis.

Calcd. for $C_3F_7CH_2(CH_2CHCH_2NHCOCH_3)_3I$: 21.9% F, 6.9% N, 20.9% I. Found: 22.3% F, 6.0% N, 18.4% I.

This formula of course only reports the average compositions, it was not established that the product is a pure compound.

Example 6

Addition of $C_3F_7CH_2I$ to vinyl methyl dichloro-silane:

In a 43 ml. autoclave was placed 31.0 g. of $C_3F_7CH_2I$, 14.1 g. of vinyl methyl dichloro silane, 1.1 g. of di-t-butyl peroxide. The autoclave was sealed and heated for sixteen hours at 145° C. The reaction mixture was fractionally distilled at reduced pressure to avoid decomposition of the iodine-containing products. There was obtained one fraction (2.25 g.), B.P. 94–95° C. at 10 mm. pressure, having $n_D^{25}$ 1.4392. This material was identified as the 1:1 adduct by analysis.

Calcd. for $C_3F_7CH_2(CH_2CHSiCH_3Cl_2)_1I$: 15.7% Cl, 28.2% I. Found: 18.6% Cl, 26.0% I.

The analysis suggests that a small amount of the 1:2 adduct was present as impurity. A higher boiling fraction, B.P. 155–170° C. at 10 mm., $n_D^{25}$ 1.4650 (2.0 g.) was identified by analysis as principally the 1:3 adduct.

Calcd. for $C_3F_7CH_2(CH_2CHSiCH_3Cl_2)_3I$: 29.0% Cl, 17.3% I. Found: 30.3% Cl, 15.1% I.

Example 7

Equimolar quantities of $H(CF_2)_4CH_2I$ and octene-1 were placed in a long (approx. 2 ft.) upright, thin "Pyrex" tube shaped like a test tube. The tube was then irradiated under normal room temperature (about 25° C.) with ultra violet light by placing the tube about two inches from a quartz-mercury-arc lamp for several hours.

The contents of the tube were then evaporated to a constant weight product over a steam bath, which product represented about an 11% yield.

The product,

separated from residue by dissolution in about 50 ml. perfluorinated ethyl cyclohexane and subsequent decantation followed by evaporation of solvent, was an amber colored oil, $n_D{}^{25}$ 1.4406. Nuclear resonance spectrum analysis of this oil confirmed the presence of the HCF$_2$ group by registering a triplet peak at 4.01τ. The presence of the CHI group was confirmed by the presence of a broad peak at 6.04τ, characteristic of this group in this type of compound. The presence of the CH$_3$ group and the CH$_2$ groups was also established by nuclear resonance spectrum peaks at 9.10τ and 8.69τ respectively. It is to be noted that the CH$_3$, CH$_2$ and CHI nuclear resonance peaks of this compound are essentially duplicates of those for the product of Example I.

The absence of unreacted starting materials in the product was established by the absence of the triplet peak at 6.38τ, which is characteristic for H(CF$_2$)$_4$CH$_2$I, and further verified by the absence of any peak at 4.94τ, which is characteristic for octene-1. The meaning of the τ units is described in my paper "Proton Nuclear Resonance Spectroscopy. I. Reliable Shielding Values by Internal Referencing With Tetramethylsilane" which can be found in the August 1958 Journal of Physical Chemistry, and this information is incorporated herein by reference.

The compound structure was also established by chemical analysis, the calculated weight ratio of fluorine to iodine being 1.20, the ratio found being 1.29; C, calc., 34.4%; C, found, 39.9% (indicating small amt. of $n=2$ adduct).

*Example 8*

Equimolar quantities, 12.78 g. and 4.62 g. respectively of C$_3$F$_7$CH$_2$I and octene-1, were mixed together in a 10 ml. open mouth flask equipped with a long neck. The flask was then placed, at normal room temperature, about an inch from a quartz-mercury-arc lamp for approximately 12 hours. The mixture progressively darkened during this period to a dark amber color.

After removal from the flask at the end of the reaction period a portion of the reaction mixture was air dried on a steam bath to a constant weight residue, which showed a 13% conversion to the desired reaction product, C$_3$F$_7$CH$_2$CH$_2$CHIC$_6$H$_{13}$, the product identification being confirmed by both infrared spectral analysis and nuclear magnetic resonance spectroscopy.

Among other olefinic compounds which provide desirable adducts when reacted with polyfluoroalkyl methyl iodides in the practice of this invention are terminally unsaturated straight chain monoolefins, such as ethylene, propylene, butylene, etc.; allyl chloride and higher terminally unsaturated olefinic chlorides; 4-bromobutene-1 and higher terminally unsaturated olefinic bromides; vinyl and isopropenyl esters of aliphatic acids, such as vinyl acetate, isopropenyl acetate, etc.; vinyl alkyl ethers as vinyl methyl ether, vinyl isobutyl ether, etc.; vinyl methyl thio ether, vinyl ethyl thio ether, etc.; allyl acetate and higher allyl esters; methallyl propionamide, etc.; 3-butenoic acid and higher terminally unsaturated carboxylic acids; olefins of the type CH$_2$=CRR$_1$ where R and R$_1$ are alkyl; vinylidene fluoride; alicyclics with olefinic substituents; internal olefins, i.e., butene-2-, pentene-2, etc.; internally unsaturated longer chain bromides, and chlorides; cyclic olefins, i.e., cyclopentene, cyclohexene, etc.; olefinic silanes such as vinyl methyl diethoxy silane, vinyl triethoxy silane, vinyl trichloro silane, 4-cyclohexenyl trichloro silane and 4-cyclohexenyl methyl dichlorosilane.

The algebraic sum of the Hammett sigma (para) parameter values of the substituents bonded to the ethylenic carbon atoms of any given olefinic compound of the aforementioned series does not exceed +0.2.

Compounds produced by the method described hereinbefore can participate in many reactions associated with normal alkyl iodides. They can be hydrolyzed to alcohols with aqueous bases, they can be converted to amines by reaction with ammonia, and to nitriles by reaction with KCN, and can participate in many other such reactions.

Those compounds wherein the fluorinated "tail" is three or more carbon atoms in length are particularly valuable because this highly inert tail repels both water and oil while the iodide group provides a ready means for attaching the compound to a solubilizing group, or, alternatively to a resin forming or adsorbable group suitable for surface coating applications.

What is claimed as new is as follows:

1. A process for the production of stable, polyfluoroiodo compounds containing a highly fluorinated end group and an iodine carrying carbon atom separated from said end group by at least two intervening carbon atoms, said process comprising reacting in the presence of an active source of free radicals a polyfluoroalkyl methyl iodide corresponding to the formula Y(CF$_2$)$_m$CH$_2$I wherein Y is a member of the group consisting of hydrogen and fluorine and $m$ is an integer from about 1 to 12, and an ethylenically unsaturated aliphatic compound copolymerizable with other olefinic compounds under free-radical initiation and corresponding to the formula

the free valences of the ethylenic carbon atoms being satisfied by a combination of monovalent radicals, the algebraic sum of the Hammett sigma (para) parameter values of which is not greater than +0.2, and usefully recovering as addition products of the reaction, compounds represented by the formula

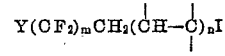

wherein $n$ is an integer from 1 to about 60.

2. A process for the production of stable, polyfluoroiodo compounds containing a highly fluorinated end group and an iodine carrying carbon atom separated from said end group by at least two intervening carbon atoms, said process comprising reacting in the presence of an active source of free-radicals a polyfluoroalkyl methyl iodide corresponding to the formula Y(CF$_2$)$_m$CH$_2$I wherein Y is a member of the group consisting of hydrogen and fluorine and $m$ is an integer from about 1 to 12, and an ethylenically unsaturated aliphatic compound copolymerizable with other olefinic compounds under free-radical initiation and corresponding to the formula

the free valences of the ethylenic carbon atoms being satisfied by a combination of monovalent radicals, the algebraic sum of the Hammett sigma (para) parameter values of which is not greater than +0.2, and usefully recovering as addition products of the reaction, compounds represented by the formula

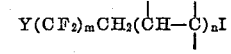

wherein $n$ is an integer from 1 to about 3.

3. A process for the production of stable, polyfluoroiodo compounds containing a highly fluorinated "tail" and an iodine carrying carbon atom separated from said "tail" by at least two intervening carbon atoms, said process comprising reacting in the presence of an active source of free radicals a polyfluoralkyl methyl iodide corresponding to the formula Y(CF$_2$)$_m$CH$_2$I wherein Y is a member of the group consisting of hydrogen and fluorine and $m$ is an integer from about 3 to 12, and an ethylenically unsaturated aliphatic compound copolymerizable with other olefinic compounds under free-radical initiation and corresponding to the formula $$HC=C$$

the free valences of the ethylenic carbon atoms being satisfied by a combination of monovalent radicals, the algebraic sum of the Hammett sigma (para) parameter values of which is not greater than $+0.2$, and usefully recovering as addition products of the reaction, compounds represented by the formula $$Y(CF_2)_mCH_2(CH-C)_nI$$

wherein $n$ is an integer from 1 to about 3.

4. The process of claim 3 wherein Y is fluorine.
5. The process of claim 3 wherein Y is hydrogen.
6. Polyfluoro-iodo compounds containing a highly fluorinated "tail" and an iodine carrying carbon atom separated from said "tail" by at least two intervening carbon atoms and corresponding to the formula $$Y(CF_2)_mCH_2(CH_2-CH)_nI \quad \text{with substituent } R$$

wherein Y is selected from the group consisting of hydrogen and fluorine, $m$ is an integer from 3 to 12, $n$ is an integer from 1 to 3, and R is a member selected from the group consisting of hydrogen, and alkyl, and substituted alkyl radicals containing from 1 to 10 carbon atoms.

7. Polyfluoro-iodo compounds containing a highly fluorinated "tail" and an iodine carrying carbon atom separated from said "tail" by at least two intervening carbon atoms and corresponding to the formula $$Y(CF_2)_mCH_2(CH_2-CH)_nI \quad \text{with substituent } R$$

wherein Y is selected from the group consisting of hydrogen and fluorine, $m$ is an integer from 3 to 12, $n$ is an integer from 1 to about 60, and R is a member selected from the group consisting of hydrogen, and alkyl, and substituted alkyl radicals containing from 1 to 10 carbon atoms.

8. The compounds of claim 7 wherein Y is fluorine.
9. The compounds of claim 7 wherein $n$ is an integer from 1–3, and Y is fluorine.
10. The compounds of claim 7 wherein $n$ is an integer from 1–3, Y is fluorine, and R is hydrogen.

References Cited in the file of this patent

UNITED STATES PATENTS

| | | |
|---|---|---|
| 2,440,800 | Hanford | May 4, 1948 |
| 2,715,113 | Gordon | Aug. 9, 1955 |
| 2,808,425 | Hazeldine | Oct. 1, 1957 |

OTHER REFERENCES

Tarrant: "Development of Fluoro-Silicone Elastomers," Wright Air Development Center, Technical Report 55–200, part 1, (August 1955), page 24.